United States Patent [19]
Kino

[11] Patent Number: 5,208,850
[45] Date of Patent: May 4, 1993

[54] MULTI-MEDIA INFORMATION SERVICE CENTER AND MULTI-MEDIA COMMUNICATION SYSTEM

[75] Inventor: Tooru Kino, Kunitachi, Japan

[73] Assignee: Fujitsu Limited, Japan

[21] Appl. No.: 741,962

[22] Filed: Aug. 5, 1991

Related U.S. Application Data

[63] Continuation of Ser. No. 477,429, Feb. 9, 1990, abandoned.

Foreign Application Priority Data

Feb. 9, 1989 [JP] Japan .................... 1-30577

[51] Int. Cl.⁵ .................... H04M 1/64; H04M 11/00
[52] U.S. Cl. .................... 379/88; 379/67; 379/100
[58] Field of Search .................... 379/88, 67, 100

[56] References Cited

U.S. PATENT DOCUMENTS

| | | | |
|---|---|---|---|
| 4,788,714 | 11/1988 | Hashimoto | 379/74 |
| 4,800,439 | 1/1989 | Yoshino | 379/67 X |
| 4,821,312 | 4/1989 | Horton et al. | 379/102 |
| 4,868,865 | 9/1989 | Ogawa et al. | 379/100 |
| 4,916,607 | 4/1990 | Teraichi et al. | 364/200 |
| 4,974,253 | 11/1990 | Hashimoto | 379/100 |

FOREIGN PATENT DOCUMENTS

| | | | |
|---|---|---|---|
| 0241367 | 11/1985 | Japan | 379/100 |
| 0281655 | 12/1987 | Japan | 379/214 |
| 0063262 | 3/1988 | Japan | 379/100 |
| 0184444 | 7/1988 | Japan | 379/100 |
| 0233653 | 9/1988 | Japan | 379/94 |
| 0256047 | 10/1988 | Japan | 379/100 |
| 0294061 | 11/1988 | Japan | 379/100 |
| WO87/07802 | 12/1987 | World Int. Prop. O. | 379/100 |

Primary Examiner—Thomas W. Brown

[57] ABSTRACT

A multi-media information service center is coupled to a telephone set and a communication unit via a line network and comprises a line connection part coupled to the line network for connecting the multi-media information service center to a predetermined line of the line network in response to a call which is received from a party which is coupled to an end of the predetermined line opposite to the multi-media information service center. The multi-media information service center further comprises a storage part for storing a voice information, a voice information transmission part coupled to the line network, the line connection part and the storage part for reading the voice information from the storage part and transmitting the voice information to the predetermined line, a discrimination part coupled to the line network for discriminating a communication mode of the party, and a service providing part coupled to the line network and the discrimination part for providing to the party a service which is dependent on a discrimination result in the discrimination part. The voice information transmission part and the discrimination part operate simultaneously after the line connection part connects the multi-media information service center to the predetermined line.

18 Claims, 7 Drawing Sheets

MULTI-MEDIA INFORMATION SERVICE CENTER AND MULTI-MEDIA COMMUNICATION SYSTEM

This application is a continuation of application Ser. No. 07/477,429, filed Feb. 9, 1990, now abandoned.

BACKGROUND OF THE INVENTION

The present invention generally relates to multi-media information service centers and multi-media communication systems, and more particularly to a multi-media information service center and a multi-media communication system which provides multi-media services such as voice mail and facsimile mail services using the same line.

Presently, there are services utilizing telephones and facsimile machines, such as voice mail service, facsimile mail service, voice information distribution service, facsimile information distribution service and the like. These services have a common feature. That is, a man-machine interface (MMI) between a user and a service distribution center. The MMI makes the necessary information transmission and reception by sending a voice guidance from the service distribution center and receiving a push button signal or the like which is input from the user in response to the voice guidance.

Figure 1:
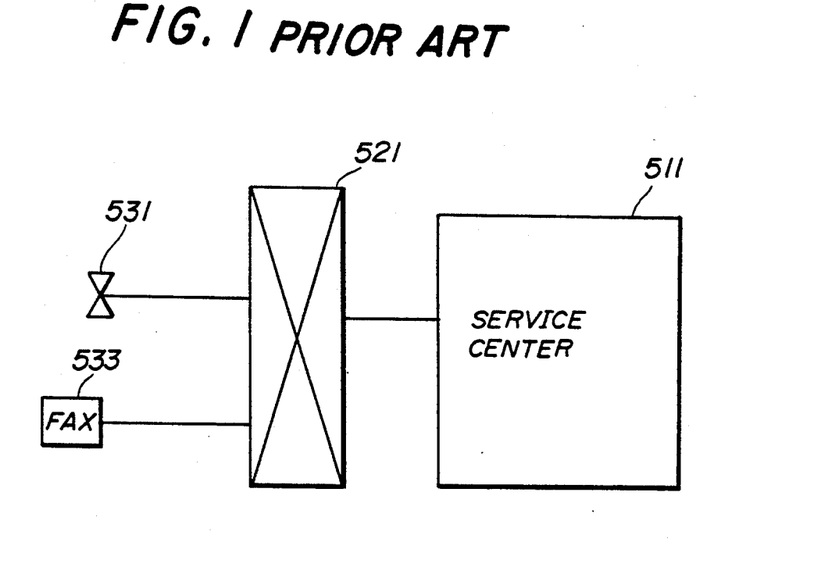
FIG. 1 is a system block diagram generally showing an example of a conventional multi-media communication system.

FIG. 1 generally shows an example of a conventional multi-media communication system which provides the various services described above. The multi-media communication system comprises a multi-media information service center (hereinafter simply referred to as a center) 511 for providing the various services, a public telephone network 521, a telephone set 531 which is used by a user, and a facsimile machine 533 which is used by a user.

Conventionally, the center 511 generates voice guidance in the following manner. That is, digitally coded voice data are prestored on a hard disk of a disk drive unit within the center 511, and the voice data required for making the MMI with the user are read out from the hard disk when needed. The voice data are output on a line as the voice guidance.

When providing the voice mail and facsimile mail services on the same line, the center 511 discriminates by hardware after a call is connected whether the mode is an automatic transmission/reception mode or a manual mode. The center 511 outputs the voice guidance after recognizing the manual mode.

Figure 2A:
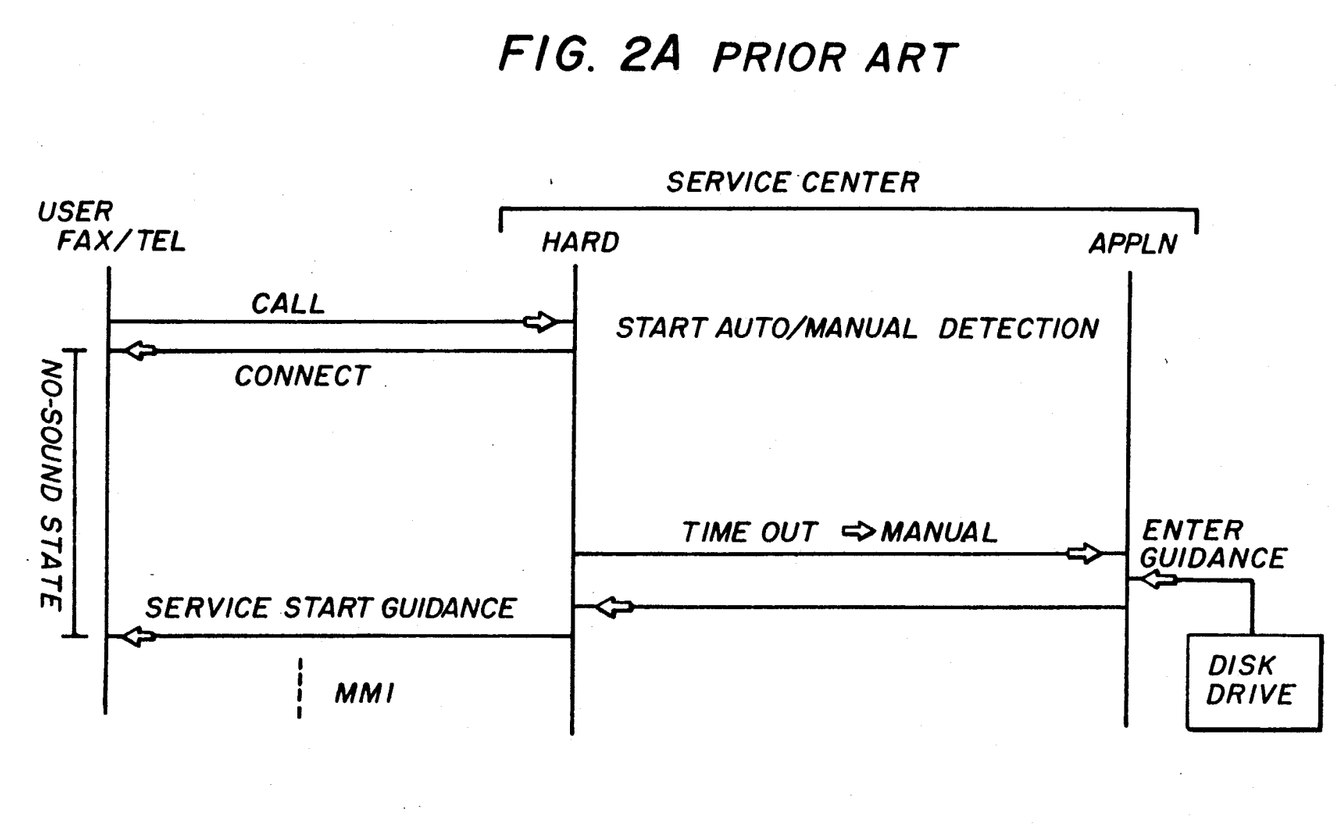
FIGS. 2A and 2B are time charts for explaining an operation procedure of a conventional multi-media information service center shown in FIG. 1.
Figure 2B:
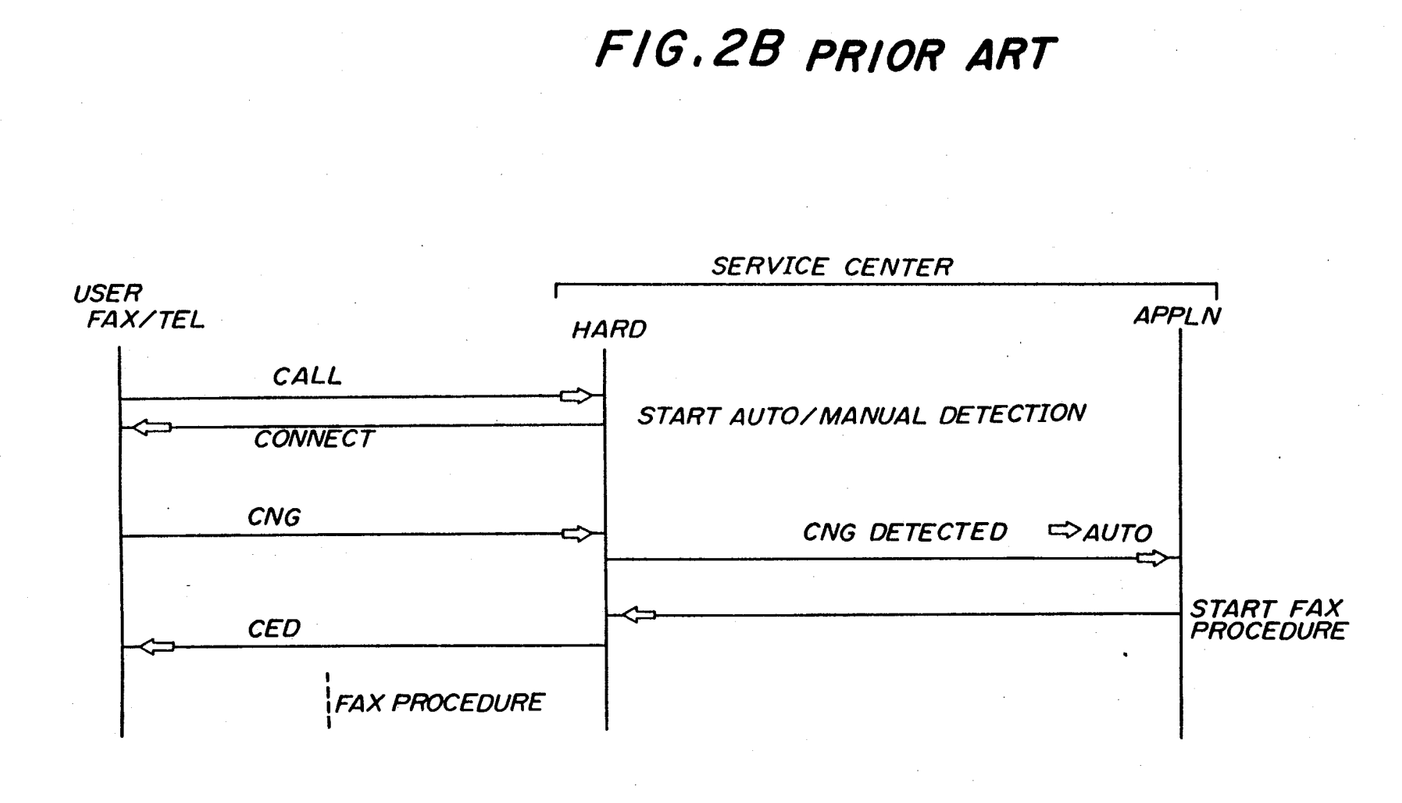

Next, a description will be given of an operation procedure of the center 511 when providing both the voice mail and facsimile mail services using the same line. FIG. 2A shows the operation of the center 511 when responding to a call from the telephone set 531, and FIG. 2B shows the operation of the center 511 when responding to a call from the facsimile machine 533. In FIGS. 2A and 2B, "USER FAX/TEL" indicates the user's facsimile machine 533 or the telephone set 531, "HARD" indicates to a hardware processing of the center 511, and "APPLN" indicates a software processing of the center 511.

When responding to the call from the telephone set 531, the hardware within the center 511 accepts the call and connects the line as shown in FIG. 2A. When a calling signal in conformance with the standard facsimile procedure is not received from the telephone set 531 within a predetermined time, the application software of the center 511 discriminates that the caller is a telephone set and starts to output the voice guidance. In other words, the disk drive unit of the center 511 reads out the voice data from the hard disk and outputs to the line. Thereafter, the operator of the telephone set 531 makes an operation depending on the received voice guidance so as to receive the desired service.

On the other hand, when responding to the call from the facsimile machine 533, the hardware within the center 511 accepts the call and connects the line as shown in FIG. 2B. In this case, the calling signal is received within the predetermined time, and the application software of the center 511 discriminates that the caller is a facsimile machine. Hence, the center 511 thereafter starts the facsimile procedure.

But according to the conventional multi-media communication system, the line connection between the user and the center 511 is detected by the hardware within the center 511 and the application software is informed of the detection result. Then, the application software reads out the digitally coded voice data from the hard disk by controlling the disk drive unit and the voice guidance is output on the line. Due to the time which is needed to make the above described detection and read out of the digitally coded voice data, there is an inevitable time delay from the time when the line between the caller and the center 511 is connected and the time when the caller receives the voice guidance from the center 511.

In addition, when a plurality of services are provided on the same line such as the case shown in FIGS. 2A and 2B, there is a need to discriminate whether the caller is the operator of the telephone set 531 or the facsimile machine 533. Due to the time (for example, three seconds) which is needed to make the above described discrimination, there is an inevitable time delay from the time when the line between the caller and the center 511 is connected and the time when the caller receives the voice guidance from the center 511.

Therefore, there is an inevitable time delay from the time when the line between the caller and the center 511 is connected and the time when the caller receives the voice guidance from the center 511, because of the time which is needed to read out the digitally coded voice data from the hard disk and/or the time which is needed to discriminate the caller. The caller receives no sound during a time which corresponds to the inevitable time delay. For this reason, there is a problem in that the caller must wait for the voice message from the center 511 after the line connection is made. Especially when the caller is the telephone set 531, the operator of the telephone set 531 may misunderstand and think that a wrong connection is made when the no-sound state lasts for a relatively long time. Such a misunderstanding may lead to the operator disconnecting the line even though the line connection is correct.

SUMMARY OF THE INVENTION

Accordingly, it is a general object of the present invention to provide a novel and useful multi-media information service center and a multi-media communication system in which the problems described above are eliminated.

Another and more specific object of the present invention is to provide a multi-media information service center which is coupled to a telephone set and a communication unit via a line network, where the communication unit is other than a telephone set. The multi-media information service center comprises line connection means coupled to the line network for connecting the multi-media information service center to a predetermined line of the line network in response to a call which is received from a party which is coupled to an end of the predetermined line opposite to the multi-media information service center, storage means for storing voice information, voice information transmission means coupled to the line network, the line connection means and the storage means for reading the voice information from the storage means and transmitting the voice information to the predetermined line, discrimination means coupled to the line network for discriminating a communication mode of the party, and service providing means coupled to the line network and the discrimination means for providing to the party a service which is dependent on a discrimination result in the discrimination means. The voice information transmission means and the discrimination means operate simultaneously after the line connection means connects the multi-media information service center to the predetermined line. According to the multi-media information service center of the present invention, it is possible to transmit the voice information to the telephone set immediately after the line is connected, thereby preventing a no-sound state from being generated after the line is connected.

Still another object of the present invention is to provide a multi-media communication system comprising a multi-media information service center, a telephone set, a communication unit which is other than a telephone set, and a line network for coupling the telephone set and the communication unit to the multi-media information service center. The multi-media information service center comprises line connection means coupled to the line network for connecting the multi-media information service center to a predetermined line of the line network in response to a call which is received from a party which is coupled to an end of the predetermined line opposite to the multi-media information service center, storage means for storing a voice information, voice information transmission means coupled to the line network, the line connection means and the storage means for reading the voice information from the storage means and transmitting the voice information to the predetermined line, discrimination means coupled to the line network for discriminating a communication mode of the party, and service providing means coupled to the line network and the discrimination means for providing to the party a service which is dependent on a discrimination result in the discrimination means. The voice information transmission means and the discrimination means operate simultaneously after the line connection means connects the multi-media information service center to the predetermined line. According to the multi-media communication system of the present invention, it is possible to transmit the voice information to the telephone set immediately after the line is connected, thereby preventing a no-sound state from being generated after the line is connected.

Other objects and further features of the present invention will be apparent from the following detailed description when read in conjunction with the accompanying drawings.

DESCRIPTION OF THE PREFERRED EMBODIMENTS

First, a description will be given of the operating principle of the multi-media communication system according to the present invention, by referring to FIG. 3. The multi-media communication system generally comprises a line connection means 111, a storage means 121, a voice information transmission means 131, a discrimination means 141, and a service providing means 151.

The line connection means 111 performs a line connection process. The storage means 121 stores voice information, and the stored voice information can be read out from the storage means 121 at a high speed. The voice information transmission means 131 reads out the voice data from the storage means 121 and transmits the voice data on a line which is connected by the line connection means 111. The discrimination means 141 discriminates the communication mode with respect to the party who is connected to the other end of the line. The service providing means 151 provides a service which is dependent on the discrimination result obtained in the discrimination means 141, and this service is provided to the party who is connected to the other end of the line. After the line is connected by the line connection means 111, the transmission of the voice information by the voice information transmission means 131 and the discrimination of the communication mode made in the discrimination means 141 are carried out in parallel, that is, simultaneously.

When the line is connected by the line connection means 111, the voice information transmission means 131 reads out the voice information from the storage means 121 and transmits the voice information on the line. At the same time as this transmission of the voice information, the discrimination means 141 discriminates the communication mode of the communication which is made from the party who is connected to the other end of the line. The service providing means 151 provides a service which is dependent on the discrimination result obtained in the discrimination means 141.

Therefore, the present invention is characterized by the simultaneous operation of the voice information transmission means 131 and the discrimination means 141.

Figure 4:
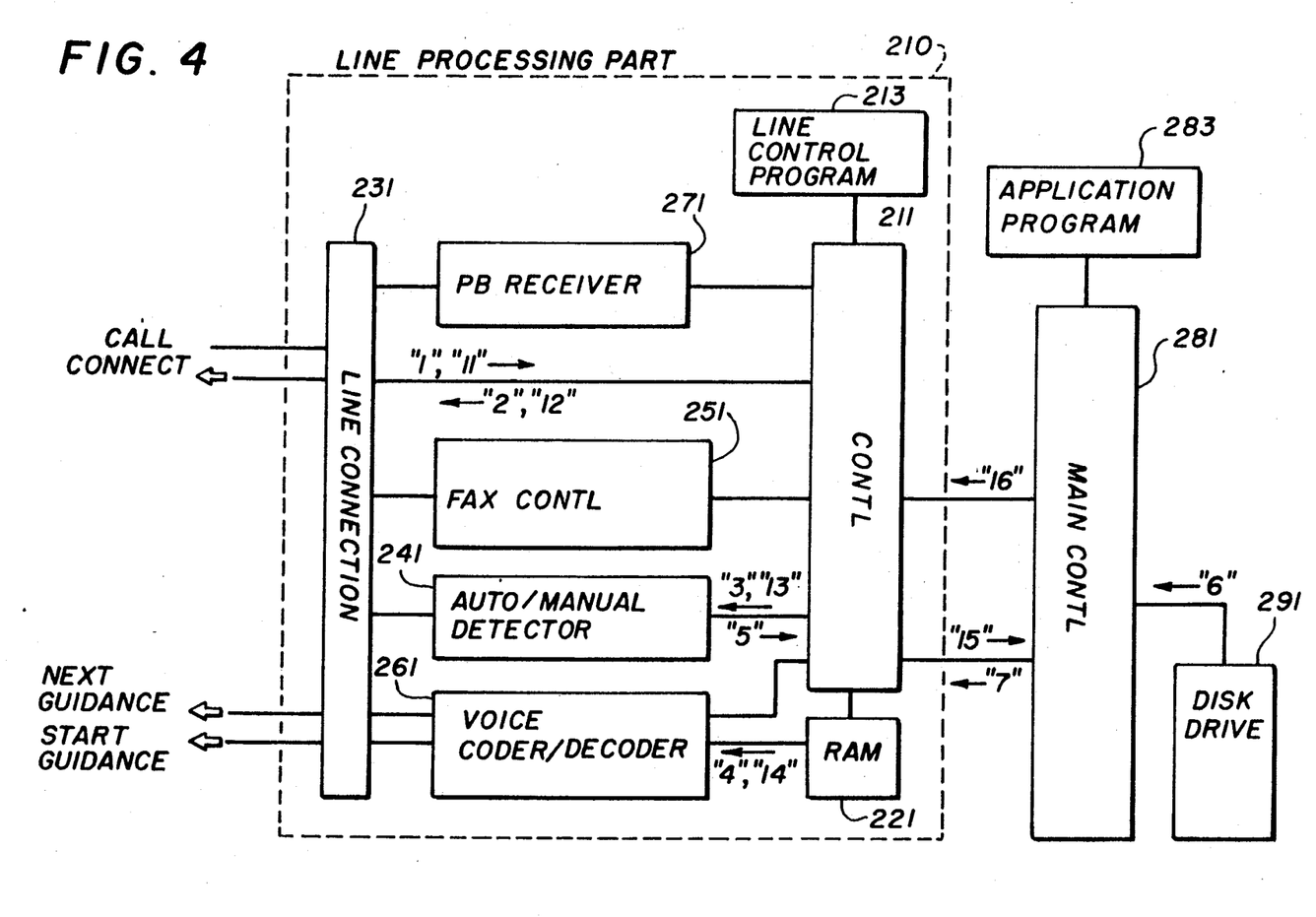
FIG. 4 is a system block diagram showing an embodiment of the multi-media communication system according to the present invention.

Next, a description will be given of an embodiment of the multi-media communication system according to the present invention, by referring to FIG. 4. In FIG. 4, the multi-media communication system generally comprises a line processing part 210, a main controller 281 which runs application programs 283, and a hard disk drive unit 291. The line processing part 210 comprises a controller 211 which runs line control programs 213, a random access memory (RAM) 221, a line connection part 231, an automatic/manual detector 241, a facsimile controller 251, a voice coder/decoder 261, and a push button signal receiver (hereinafter simply referred to as a PB receiver) 271.

Figure 3:
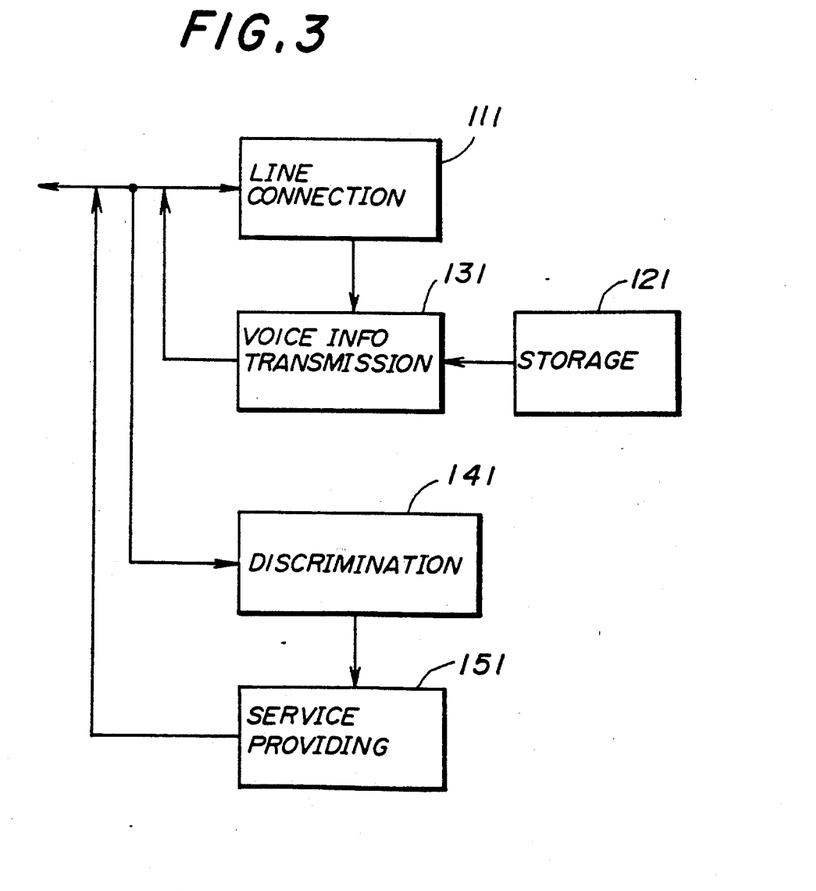
FIG. 3 is a system block diagram generally showing a multi-media communication system according to the present invention for explaining an operating principle thereof.

The controller 211 and the line connection part 231 correspond to the line connection means 111 shown in FIG. 3. The RAM 221 and hard disk drive unit 291 corresponds to the storage means 121. The controller 211 and the voice coder/decoder 261 correspond to the voice information transmission means 131. The controller 211 and the automatic/manual detector 241 correspond to the discrimination means 141. The controller 211, the facsimile controller 251, the voice coder/decoder 261, the PB receiver 271 and the main controller 281 correspond to the service providing means 151.

The system shown in FIG. 4 corresponds to the multi-media service center 511 shown in FIG. 1. In FIG. 4, the main controller 281 controls the entire operation of the center 511. Various control operations are carried out by the main controller 281 by executing the application programs 283.

The line processing part 210 controls the signal transmission and reception between the center 511 and the public telephone network 521. The hard disk drive unit 291 drives a hard disk (not shown) which stores the voice guidance information which is intended to give operating instructions to the operator of the telephone set 531.

The controller 211 controls the entire operation of the line processing part 210. Various control operations are carried out by the controller 211 by executing the line control programs 213. The RAM 221 constitutes a semiconductor memory for storing a portion of the voice guidance information. The stored guidance information can be read out from the RAM 221 at a high speed. The line connection part 231 makes a physical connection to the line.

The automatic/manual detector 241 detects a calling signal CNG and a called station identification signal CED which are in conformance with the standard facsimile procedure so as to discriminate whether the party on the other end of the line is the facsimile machine 533 or the telephone set 531. The facsimile controller 251 controls the transmission and reception of the facsimile image information in conformance with the facsimile communication protocol. The voice coder/decoder 261 modulates the voice guidance information (digital data) which is received and transmits an analog voice signal on the line via the line connection part 231.

The controller 211 is connected to various parts of the line processing part 210. The line connection part 231 is connected to automatic/manual detector 241, the facsimile controller 251, the voice coder/decoder 261, the PB receiver 271, and the line. The RAM 221 is connected to the voice coder/decoder 261.

Furthermore, the main controller 281 is connected to the controller 211 and the hard disk drive unit 291.

Figure 5:
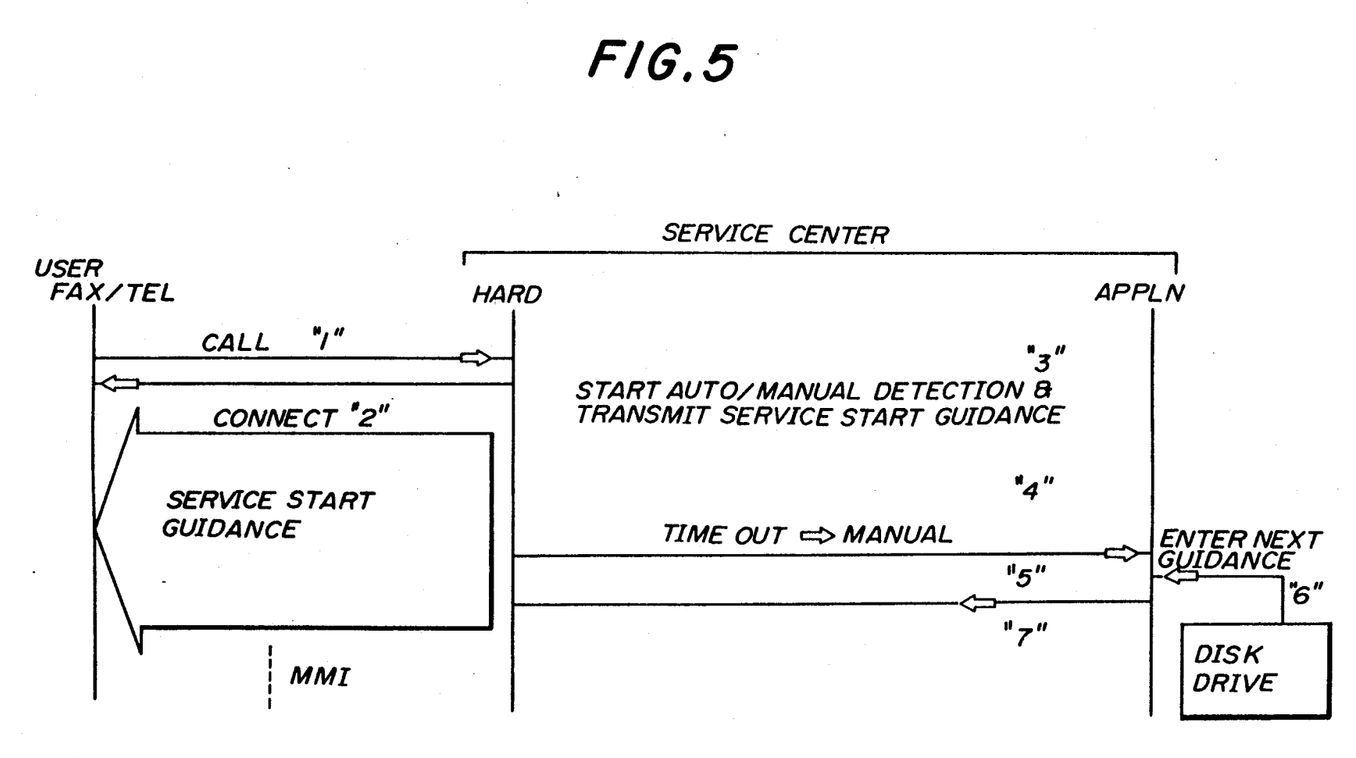
FIGS. 5 and 6 are time charts for explaining an operation of the embodiment shown in FIG. 4.
Figure 6:
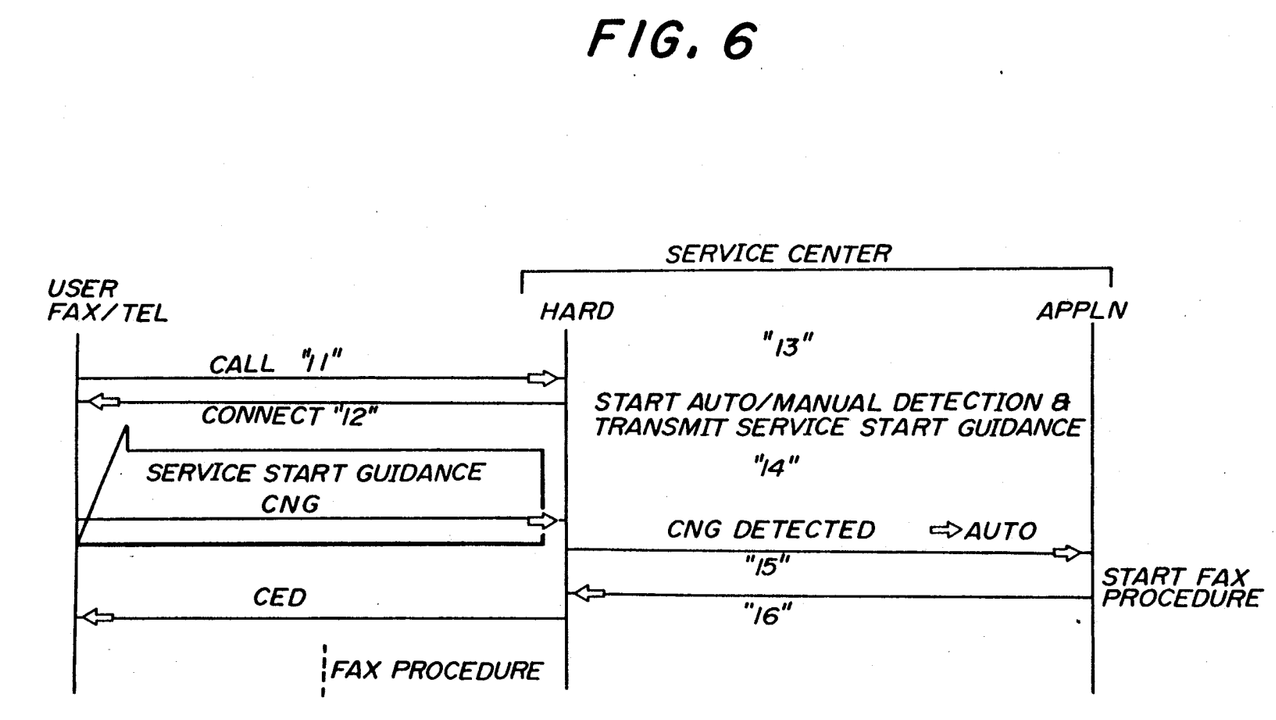

Next, a description will be given of the operation procedure of this embodiment by referring to the time charts of FIGS. 5 and 6. In FIGS. 5 and 6, "USER FAX/TEL" indicates the user's facsimile machine 533 or the telephone set 531, "HARD" indicates hardware processing of the center 511, and "APPLN" indicates a software processing of the center 511. "HARD" corresponds to the process carried out by the line connection part 231 which functions as an interface to the lines and the various signal transmission and detection processes carried out by the automatic/manual detector 241, the facsimile controller 251, the voice coder/decoder 261 and the PB receiver 271. "APPLN" corresponds to the processes carried out by the controller 211 and the main controller 281. In addition, the numbers "1" through "7" and "11" through "16" shown in FIGS. 5 and 6 correspond to the operation procedure numbers which will be described hereunder.

For the sake of convenience, it is assumed that a service start guidance (voice guidance) which is 10 seconds long is stored in the RAM 221 for being transmitted to the telephone set 531 after the line connection is made. For example, when coding the voice at 32 kbps, the RAM 221 requires a memory capacity in the order of 40 kbytes.

A description will be made for a first case where the party on the other end of the line is the telephone set 531 and a second case where the party on the other end of the line is the facsimile machine 533. In the first case, the caller makes a manual call out from the telephone set 531. On the other hand, in the second case, the caller makes an automatic call out from the facsimile machine 533.

The first case will be described first.

"1": The line connection part 231 detects the call out from the telephone set 531 and informs the result of the detection to the controller 211.

"2": The controller 211 instructs the line connection part 231 to accept the call, and a line is connected between the center 511 and the telephone set 531.

"3": After the line is connected, the controller 211 starts the automatic/manual detector 241. The automatic/manual detector 241 has an internal timer and supervises the existence of the calling signal CNG which is received from the caller within a predetermined time which is three seconds, for example.

"4": Simultaneously with the starting of the automatic/manual detector 241, the controller 211 supplies a transmission instruction to the voice coder/decoder 261 so as to transmit the service start guidance on the line. The voice coder/decoder 261 reads out the voice data which is related to the service start guidance from the RAM 221 in response to the transmission instruction, codes the read out voice data and supplies the coded voice data (service start guidance) on the line. Because the voice data can be read out from the RAM 221 at a high speed, the operator of the telephone set 531 can listen to the service start guidance immediately after the line is connected.

"5": When the automatic/manual detector 241 does not detect the calling signal CNG within the predetermined time, the controller 211 is informed of this detection result from the automatic/manual detector 241. Based on the information which is received from the automatic/manual detector 241, the controller 211 recognizes that the caller is not the facsimile machine 533 but is the telephone set 531.

"6": Based on the recognition result in the controller 211, the main controller 281 reads out the voice data from the hard disk by controlling the disk drive unit 291 so as to transmit the voice guidance to the telephone set 531 in succession to the service start guidance.

"7": The controller 211 supplies the voice data which is read out by the main controller 281 to the voice coder/decoder 261. After transmitting the service start guidance, the voice coder/decoder 261 codes the voice data which is received from the main controller 281 via the controller 211 and transmits the coded voice data (voice guidance) on the line.

Thereafter, data transmission and reception are made between the center 511 and the telephone set 531 to provide the desired service to the operator of the telephone set 531. For example, the operator pushes push buttons of the telephone set 531 in response to the voice guidance which is received from the center 511, and the operated push buttons are detected by the PB receiver 271. The main controller 281 transmits a predetermined voice information to the telephone set 531 based on the result of the detection made in the PB receiver 271.

The second case as shown in FIG. 6 will be described next.

"11": The line connection part 231 detects the call out from the facsimile machine 533 and informs the result of the detection to the controller 211.

"12": The controller 211 instructs the line connection part 231 to accept the call, and a line is connected between the center 511 and the facsimile machine 533.

"13": After the line is connected, the controller 211 starts the automatic/manual detector 241.

"14": Simultaneously with the starting of the automatic/manual detector 241, the controller 211 supplies a transmission instruction to the voice coder/decoder 261 so as to transmit the service start guidance on the line.

"15": When the automatic/manual detector 241 detects the calling signal CNG within the predetermined time, the controller 211 is informed of this detection result from the automatic/manual detector 241. Based on the information which is received from the automatic/manual detector 241, the controller 211 recognizes that the caller is the facsimile machine 533. In addition, the controller 211 informs the main controller 281 of this recognition result.

"16": Thereafter, a facsimile communication is made between the center 511 and the facsimile machine 533 to provide the desired service to the operator of the facsimile machine 533. For example, the facsimile controller 251 supplies the called station identification signal CED to the facsimile machine 533 and transmits the facsimile image information in conformance with the facsimile communication protocol.

When the other party on the other end of the line is recognized as the facsimile machine 533 in the operation procedure number "15", there is no need to transmit the service start guidance. For this reason, the controller 211 supplies a transmission stop instruction to the voice coder/decoder 261.

Therefore, according to this embodiment, the automatic/manual detector 241 is started after the line connection is made so as to detect the calling signal CNG from the caller and discriminate whether the caller is the telephone set 531 or the facsimile machine 533.

In addition, the service start guidance is transmitted to the caller at the same time as the above described discrimination of the caller. More particularly, the voice data is read out from the RAM 221 and is transmitted to the caller via the voice coder/decoder 261. Generally, full duplex lines are used in the telephone networks and line networks, and it is thus possible to simultaneously discriminate the caller and transmit the service start guidance.

Accordingly, when the caller is the telephone set 531, the operator of the telephone set 531 can listen to the service start guidance immediately after the line is connected. On the other hand, when the caller is the facsimile machine 533, the facsimile machine 533 can simply neglect the service start guidance which is received from the center 511 and carry out the normal facsimile operation in conformance with the facsimile communication protocol.

Conventionally, the accounting is made even during the no-sound state. For this reason, the elimination of the no-sound state immediately after the line connection is also advantageous in that the charge on the call from the telephone set 531 can be reduced compared to the conventional system.

Figure 7:
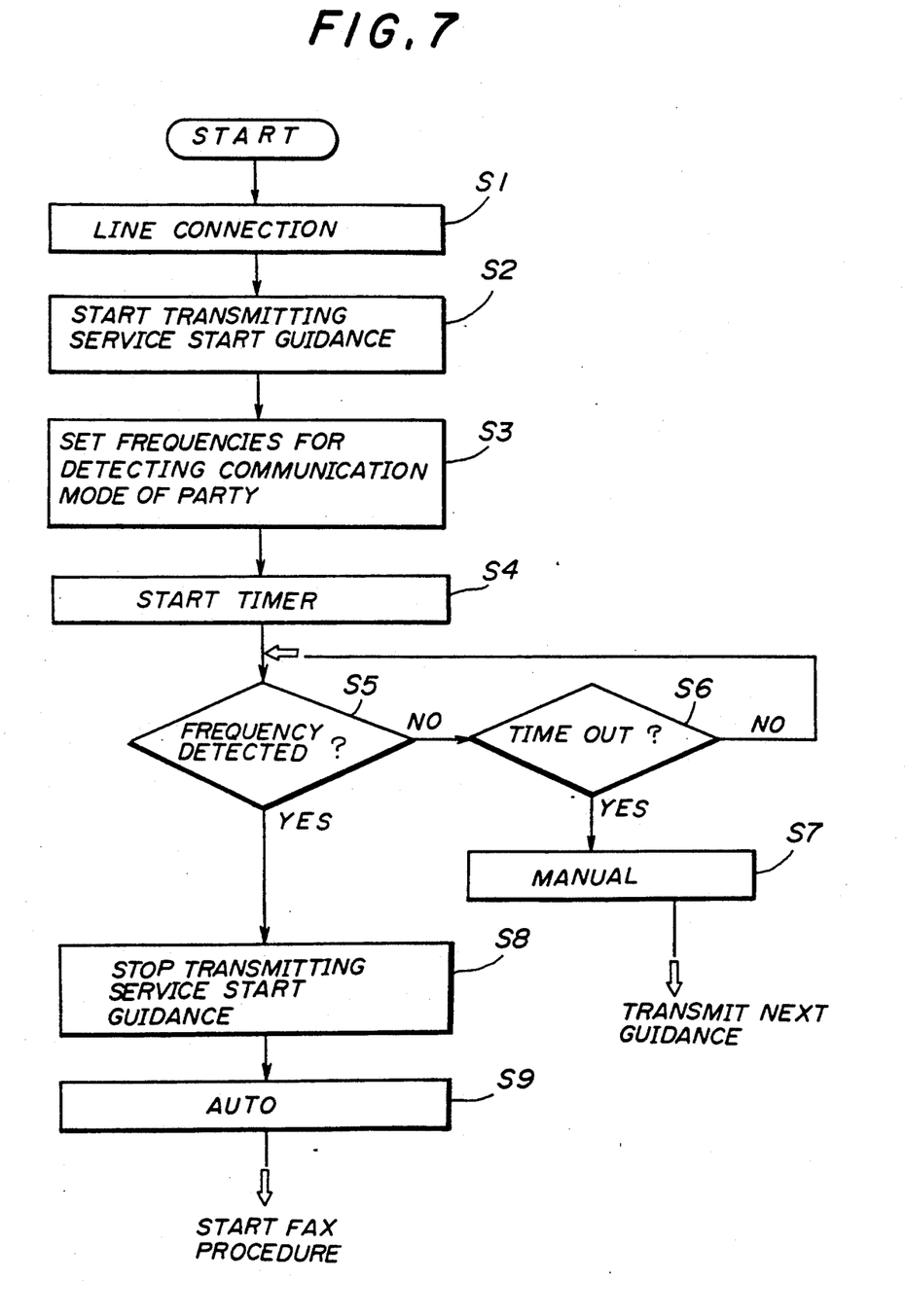
FIG. 7 is a flow chart for explaining an operation of a controller shown in FIG. 4.

FIG. 7 is a flow chart showing the operation of the controller 211. In FIG. 7, a step S1 connects the line in response to the call from the caller by controlling the line connection part 231. A step S2 starts to transmit the service start guidance by controlling the voice coder/decoder 261. A step S3 sets frequencies for detecting the communication mode of the caller. For example, a frequency of 2100 Hz is set for detecting the calling signal CNG, and a frequency of 1100 Hz is set for detecting the called station identification signal CED. A step S4 starts the internal timer of the automatic/manual detector 241 for detecting the communication mode of the caller.

A step S5 discriminates whether or not one of the set frequencies is detected. When the discrimination result in the step S5 is NO, a step S6 discriminates whether or not the predetermined time set in the internal timer of the automatic/manual detector 241 has elapsed. The process returns to the step S5 when the discrimination result in the step S6 is NO. On the other hand, when the discrimination result in the step S6 is YES, a step S7 detects that the communication mode is the manual calling mode, that is, the caller is the telephone set 531, and controls the voice coder/decoder 261 so as to transmit the voice guidance in succession to the service start guidance.

On the other hand, when the discrimination result in the step S5 is YES, a step S8 detects that the communication mode is the automatic calling mode, that is, the caller is the facsimile machine 533, and controls the voice coder/decoder 261 so as to stop the transmission of the service start guidance and start the facsimile communication procedure. Of course, it is not essential to stop the transmission of the service start guidance and it is possible to start the facsimile communication procedure after the service start guidance ends.

In the embodiment described heretofore, a discrimination is made after the line is connected so as to determine whether the party on the other end of the line is the telephone set 531 or the facsimile machine 533. However, the party on the other end of the line is not limited to the telephone set 531 and the facsimile machine 533. For example, the party may be a personal computer. In such a case, an automatic calling procedure of the personal computer is determined in advance so that the automatic/manual detector 241 can detect this automatic calling procedure of the personal computer.

Further, the present invention is not limited to these embodiments, but various variations and modifications may be made without departing from the scope of the present invention.

What is claimed is:

1. A multi-media information service center which is coupled to a telephone set that transmits keypad information and to a communication unit that transmits communication signals via a line network which includes a predetermined line, the communication unit being other than a telephone set, said multi-media information service center comprising:

line connection means for connecting the multi-media information service center to an end of the predetermined line of the line network in response to a call received from the other end of the predetermined line;

storage means for storing voice information;

voice information transmission means for reading the voice information from said storage means and for transmitting the voice information to the predetermined line;

discrimination means for receiving the call and for discriminating a communication mode of the call based on determining immediately upon reception of said communication signals within a predetermined time whether the call originated from the communication unit; and service providing means for providing a service immediately to one of the telephone set and the communication unit in response to the communication mode discriminated by said discrimination means, said voice information transmission means and said discrimination means operating simultaneously and immediately after said line connection means connects the multi-media information service center to the predetermined line.

2. The multi-media information service center as claimed in claim 1, wherein the voice information includes service start guidance, and wherein said voice information transmission means includes means for transmitting the service start guidance immediately after said line connection means connects the multi-media information service center to the predetermined line.

3. The multi-media information service center as claimed in claim 2, wherein said storage means includes a semiconductor memory for storing the service start guidance.

4. The multi-media information service center as claimed in claim 2, wherein said storage means includes:

a semiconductor memory for storing the service start guidance, and a disk drive unit for storing the voice guidance.

5. The multi-media information service center as claimed in claim 2, wherein the communication mode includes a manual calling mode to indicate a call transmitted from the telephone set, and wherein said voice information transmission means includes means for transmitting voice guidance in succession with the service start guidance when said discrimination means discriminates the communication mode as the manual calling mode.

6. The multi-media information service center as claimed in claim 2, wherein the communication mode includes an automatic calling mode to indicate a call transmitted from the communication unit, and wherein said voice information transmission means includes means for stopping transmission of the service start guidance when said discrimination means discriminates the communication mode as the automatic calling mode.

7. The multi-media information service center as claimed in claim 1, wherein said discrimination means includes means for discriminating the communication mode as a manual calling mode in which a manual call is made from the telephone set when a signal in conformance with a predetermined communication procedure is not detected within a predetermined time after said line connection means connects the multi-media information service center to the predetermined line and for discriminating the communication mode as an automatic calling mode in which an automatic call is made from the communication unit when the signal in conformance with the predetermined communication procedure is detected within the predetermined time.

8. The multi-media information service center as claimed in claim 7, wherein the communication unit is a facsimile machine, and wherein the predetermined communication procedure is a facsimile communication procedure.

9. The multi-media information service center as claimed in claim 1, wherein said storage means includes a semiconductor memory.

10. A multi-media communication system, comprising:

a multi-media information service center;

a telephone set which transmits keypad information;

a communication unit which transmits communication signals and which is other than a telephone set; and a line network for coupling said telephone set and said communication unit to said multi-media information service center including a predetermined line;

said multi-media information service center comprising:

line connection means for connecting the multi-media information service center to an end of the predetermined line of the line network in response to a call received from the other end of the predetermined line, storage means for storing voice information, voice information transmission means for reading the voice information from said storage means and for transmitting the voice information to the predetermined line, discrimination means for receiving the call and for discriminating a communication mode of the call based on determining immediately upon reception of said communication signals within a predetermined time whether the call originated from the communication unit, and service providing means for providing a service immediately to one of the telephone set and the communication unit responsive to the communication mode discriminated by said discrimination means, said voice information transmission means and said discrimination means operating simultaneously and immediately after said line connection means connects the multi-media information service center to the predetermined line.

11. The multi-media communication system as claimed in claim 10, wherein the voice information includes service start guidance, and wherein said voice information transmission means includes means for transmitting the service start guidance immediately after said line connection means connects said multi-media information service center to the predetermined line.

12. The multi-media communication system as claimed in claim 11, wherein said storage means includes a semiconductor memory for storing the service start guidance.

13. The multi-media communication system as claimed in claim 11, wherein said storage means includes:
   a semiconductor memory for storing the service start guidance, and
   a disk drive unit for storing voice guidance.

14. The multi-media information service center as claimed in claim 11, wherein the communication mode includes a manual calling mode to indicate a call transmitted from the telephone set, and wherein
   said voice information transmission means includes means for transmitting voice guidance in succession with the service start guidance when said discrimination means discriminates the communication mode as the manual calling mode.

15. The multi-media information service center as claimed in claim 11, wherein the communication mode includes an automatic calling mode to indicate a call transmitted from the communication unit, and wherein said voice information transmission means includes means for stopping transmission of the service start guidance when said discrimination means discriminates the communication mode as the automatic calling mode.

16. The multi-media communication system as claimed in claim 10, wherein said discrimination means includes means for discriminating the communication mode as a manual calling mode in which a manual call is made from said telephone set when a signal in conformance with a predetermined communication procedure is not detected within a predetermined time after said line connection means connects the multi-media information service center to the predetermined line and for discriminating the communication mode as an automatic calling mode in which an automatic call is made from said communication unit when the signal in conformance with the predetermined communication procedure is detected within the predetermined time.

17. The multi-media communication system as claimed in claim 16, wherein said communication unit is a facsimile machine, and wherein
   the predetermined communication procedure is a facsimile communication procedure.

18. The multi-media communication system as claimed in claim 10, wherein said storage means includes a semiconductor memory.

* * * * *

UNITED STATES PATENT AND TRADEMARK OFFICE
CERTIFICATE OF CORRECTION

PATENT NO. : 5,208,850
DATED : May 4, 1993
INVENTOR(S) : KINO

It is certified that error appears in the above-indentified patent and that said Letters Patent is hereby corrected as shown below:

TITLE PAGE: [73] Assignee: before "Japan" insert --Kawasaki,--.

Col. 1, line 59, delete "to".

Signed and Sealed this

Twenty-first Day of June, 1994

Attest:

BRUCE LEHMAN

*Attesting Officer*     *Commissioner of Patents and Trademarks*